United States Patent [19]
Brown

[11] Patent Number: 6,014,711
[45] Date of Patent: Jan. 11, 2000

[54] APPARATUS AND METHOD FOR PROVIDING ELECTRONIC MAIL RELAY TRANSLATION SERVICES

[75] Inventor: Anne R. Brown, Kanata, Canada

[73] Assignee: Nortel Networks Corporation, Montreal, Canada

[21] Appl. No.: 08/921,009

[22] Filed: Aug. 29, 1997

[51] Int. Cl.[7] .................................................. H04M 11/00
[52] U.S. Cl. ........................ 709/245; 709/206; 709/246; 379/93.01; 379/93.23
[58] Field of Search .................................. 379/93.23, 67, 379/93.01; 395/200.32, 200.57, 200.58, 200.73, 200.74, 200.75; 709/245, 244, 243, 227, 228, 202, 219, 203, 225, 232, 206, 246; 370/352

[56] References Cited

U.S. PATENT DOCUMENTS

| | | | |
|---|---|---|---|
| 5,555,426 | 9/1996 | Johnson et al. | 709/206 |
| 5,625,675 | 4/1997 | Katsumaru et al. | 379/67 |
| 5,724,412 | 3/1998 | Srinvasan | 379/93.23 |
| 5,764,906 | 6/1998 | Edelstein | 709/219 |
| 5,862,202 | 1/1999 | Bashoura et al. | 370/352 |

OTHER PUBLICATIONS

Paper entitled "Address Resolution for Voicemail Systems—X.500 Methodology", Data Connection Ltd., Sep. 1996.

*Primary Examiner*—Dung C. Dinh
*Assistant Examiner*—Chuong Ho
*Attorney, Agent, or Firm*—Max R. Wood

[57] ABSTRACT

An apparatus and a method for providing translation services to telecommunications processes for mapping from a unique identifier for an object, such as a telephone number, to an electronic address for the object, such as an electronic mail address. The apparatus and method permit telecommunication application processes to send multimedia messages created in one delivery method over the Internet in another delivery method without supporting directory standards. The advantage is the ability to develop less complicated application processes in less time and therefore get more quickly to market.

11 Claims, 4 Drawing Sheets

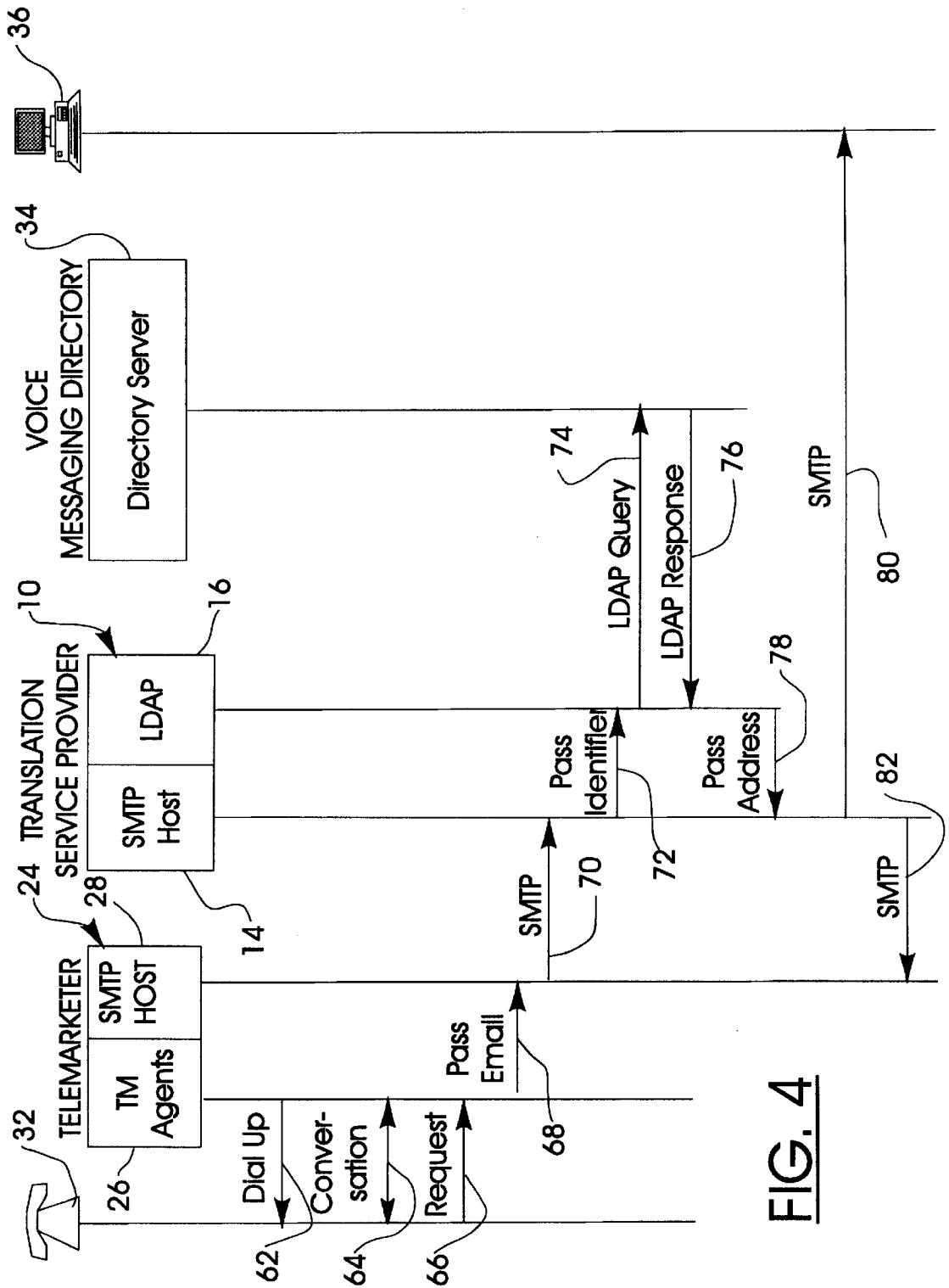

APPARATUS AND METHOD FOR PROVIDING ELECTRONIC MAIL RELAY TRANSLATION SERVICES

TECHNICAL FIELD

The present invention relates to services for delivering multi-media messages over a data network such as the Internet and, in particular, to translation services for finding an electronic address for a preferred delivery method for an electronic message to an addressee given some unique identifier for the addressee and forwarding the electronic message using the electronic address for the delivery method.

BACKGROUND OF THE INVENTION

The pervasive use of multi-media messaging applications and transport services such as the Internet has given rise to a need for translating a message created in one delivery method to a recipient's preferred delivery method and to delivering the message in the preferred delivery method. In particular, there has been interest expressed in sending voice messages over the Internet in electronic mail format. The Voice Profile for Internet Mail (VPIM) is an Internet standard created for that purpose. VPIM defines a protocol profile of an extension to Internet electronic mail. Voice messaging systems (VMSs) that support VPIM are capable of exchanging voice messages over the Internet using Internet electronic mail.

VPIM has industry acceptance and is being implemented by major voice messaging vendors. it is assumed that regular telephones will be used for some time yet as an interface for sending voice messages. Consequently, there is a requirement for a mechanism to permit a VMS to convert a telephone number of a voice message recipient into an Internet electronic mail address.

The voice messaging industry is investigating the use of Internet Light-Weight Directory Access Protocol (LDAP) for mapping from a telephone number to an Internet electronic mail address. However, first generation VPIM compliant VMSs may not support directory protocols required for such mapping. Those VMSs will use either manually updated tables, sendmail configuration files, or Domain Name Service (DNS) to map from telephone numbers to e-mail addresses. However, those options may not scale well and may not permit them to take advantage of a global voice messaging directory. Other telecommunications-related services could also profit from an ability to access data stored in the global voice messaqing directory which would enable an application process to convert an object's telephone number to an electronic mail address to permit messages and/or information to be sent to that electronic mail address.

A voice mail communication system which is enabled to convert a telephone number to an electronic mail address using a directory connected to a local area network (LAN) is known and taught in U.S. Pat. No. 5,625,675 which issued on Apr. 29, 1997 to Katsumaru et al. This patent teaches a voice mail system which includes a voice mail exchanger and a mail server connected to the LAN. Voice mail communication between a telephone and a terminal device, such as a client computer, is registered in the LAN-based multi-media mailbox. A PBX-based voice mail apparatus and the LAN-based multi-media mail system are integrated so that voice information can be commonly used and re-used. The system is enabled to support LAN directory protocols. This system does not provide an addressing solution for VPIM compliant VMSs or telecommunications applications which do not support directory protocols.

There therefore exists a need for a method and apparatus for providing translation services to VPIM compliant VMSs and other telecommunications application processes which could benefit from a service for translating telephone numbers to the address of other multi-media delivery methods.

SUMMARY OF THE INVENTION

It is an object of the invention to provide an apparatus for providing translation services to permit a telecommunications application process to dispatch a message to a recipient using a preferred delivery method when a unique identifier for the recipient is known but the address of the preferred delivery method is unknown.

It is a further object of the invention to provide an apparatus for providing translation services to permit a voice message to be sent over the Internet when at least one unique identifier for the recipient is known but the electronic mail address of the recipient is unknown.

It is a further object of the invention to permit a user of a VMS which does not support directory services to transparently dispatch a voice message to a recipient via electronic mail over the Internet.

It is yet a further object of the invention to provide a method of providing translation services to permit a telecommunications application process to send an information message over the Internet to an unknown address of a recipient of the information message when a unique identifier for the recipient is known.

It is a further object of the invention to provide a method of providing translation services to permit a VMS which does not support directory services to send a voice message over the Internet to an unknown electronic mail address of a recipient when a telephone number of the recipient is known.

In a first aspect of the invention there is provided apparatus for providing translation services to permit a telecommunications application process to send an information message over a data transmission facility when an electronic mail address of an addressee of the message is unknown, but at least one unique identifier for the addressee is known, comprising:

a host connected to the data transmission facility for receiving a data message from the telecommunications application process which is connected to the data transmission facility, the data message including the information message and the at least one unique identifier for the addressee of the information message, the host having means for deriving an electronic mail address for the addressee of the information message given the at least one unique identifier for the addressee, means for re-addressing the information message with the electronic mail address of the addressee, and means for forwarding the information message to the addressee by electronic mail.

In a second aspect of the invention there is provided a method of providing translation services to permit a telecommunications application process to send an information message over the Internet to an unknown address of a recipient of the information message when a unique identifier for the recipient is known, comprising the steps of:

(a) receiving from the telecommunications application process an electronic mail message which includes the information message and the unique identifier for the recipient;

(b) extracting the unique identifier from the electronic mail message and dispatching a query to a directory server to obtain the unknown address of the recipient from the directory server;

(c) receiving a response to the query sent to the directory server;

(d) extracting the unknown address from the response if the response returned an address;

(e) inserting the address in the information message if the response returned an address; and (f) forwarding the information message over the Internet using the address if the response returned an address.

The invention therefore provides an apparatus and a method for enabling a telecommunications process such as a VMS to send information messages over the Internet to a recipient when the electronic mail address of the recipient is unknown but a unique identifier for the recipient, such as the recipient's telephone number is known. In accordance with the invention, a service provider which provides translation services to a plurality of telecommunications application processes receives electronic mail messages over the Internet in a protocol such as Simple Mail Transport Protocol (SMTP). The electronic mail messages contain the information message to be sent to a recipient as well as the unique identifier for the recipient. The service provider extracts the unique identifier from the electronic mail message and passes it to a directory query application such as a Light-Weight Directory Access Protocol (LDAP) which uses the unique identifier for the recipient to query a directory service in order to obtain the unknown address of the recipient. The directory service may be, for example, a global voice messaging directory.

The invention therefore enables telecommunications application processes such as VPIM compliant VMSs to dispatch voice mail messages to any recipient included in the global directory without the necessity of providing the VMS with directory query capabilities, thereby decreasing time to market for VPIM compliant VMSs, and other telecommunications application processes.

BRIEF DESCRIPTION OF THE DRAWINGS

FIG. 4 is a sequence diagram showing a process for sending an information message over the Internet when the telemarketing service uses the translation services provided by the apparatus in accordance with the invention.

DETAILED DESCRIPTION OF THE PREFERRED EMBODIMENT

The invention relates to an apparatus and method for providing electronic mail relay translation services required by telecommunications application processes which do not support directory query capability. In accordance with the invention, directory query standards are supported by a translation service provider which serves a plurality of clients to map from a known unique identifier for the recipient of an information message to an address of a preferred delivery method for the message.

Figure 1:
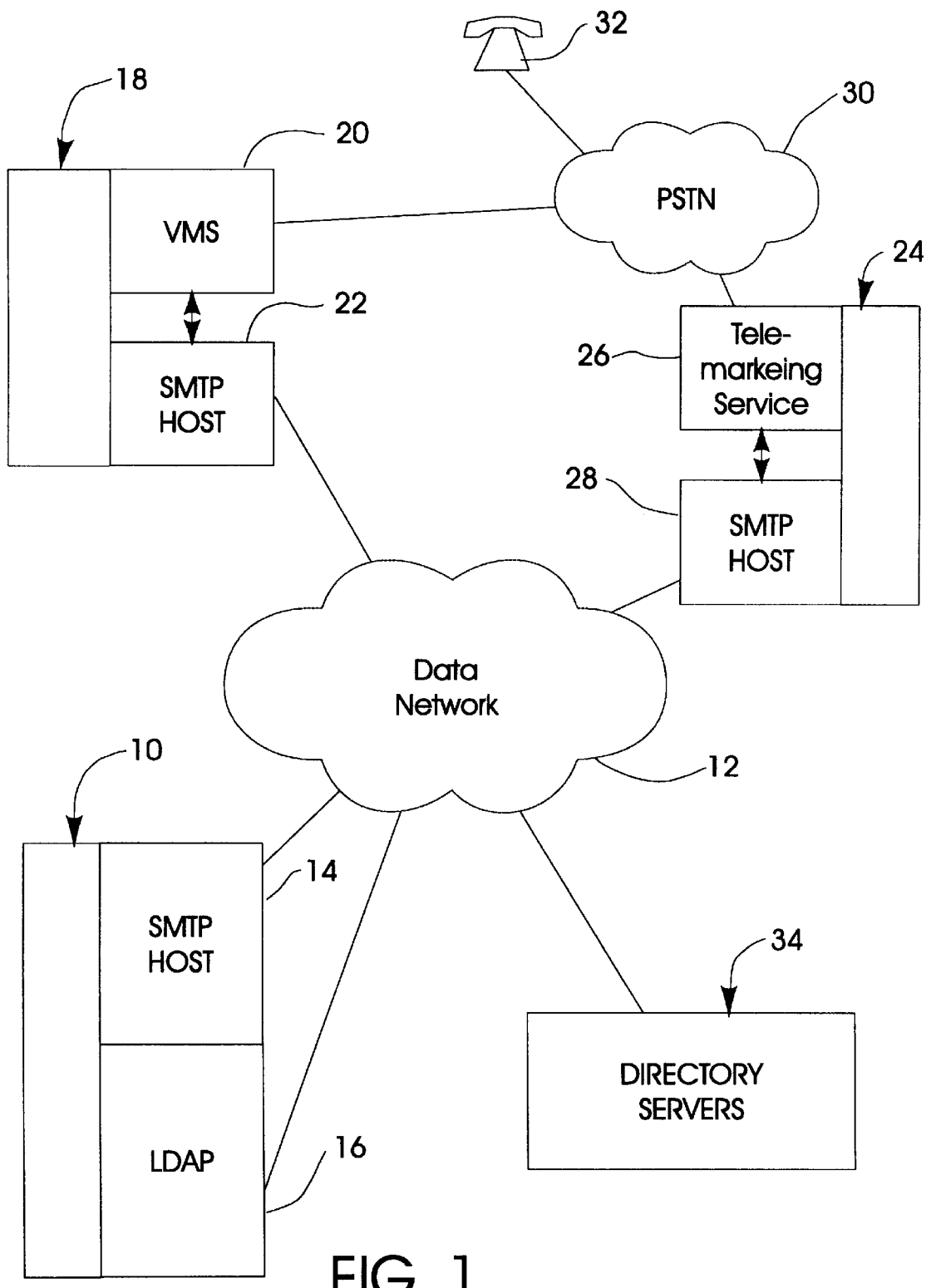
FIG. 1 is a schematic diagram showing a portion of a network which includes apparatus for providing translation services, a VPIM compliant VMS and a telemarketing service which are clients of the apparatus for providing translation service in accordance with the invention.

FIG. 1 shows a simplified schematic diagram of a network which includes apparatus in accordance with the invention. For the sake of simplicity, only relevant network nodes are shown in FIG. 1. The apparatus in accordance with the invention is a translation service provider 10 which is connected to a data network 12, such as the Internet. The service provider 10 includes an electronic mail component such as SMTP host 14 and a directory query component such as a LDAP application process 16. The translation service provider 10 provides translation services to a plurality of clients connected to the data network 12 such as a VPIM compliant VMS 18 which includes a voice message system 20 and an electronic mail host 22. Another client is, for example, a telemarketing call centre 24 which includes a telemarketing service component 26 and an electronic mail host 28. Both clients 18 and 24 are connected to the Public Switched Telephone Network (PSTN) 30 as are a plurality of telephone users represented by the telephone 32. As will be explained below in more detail, the translation service provider 10 obtains address translation data from directory servers 34 which are, for example, LDAP compliant directory servers. The use of such servers is well known in the art.

Figure 2:
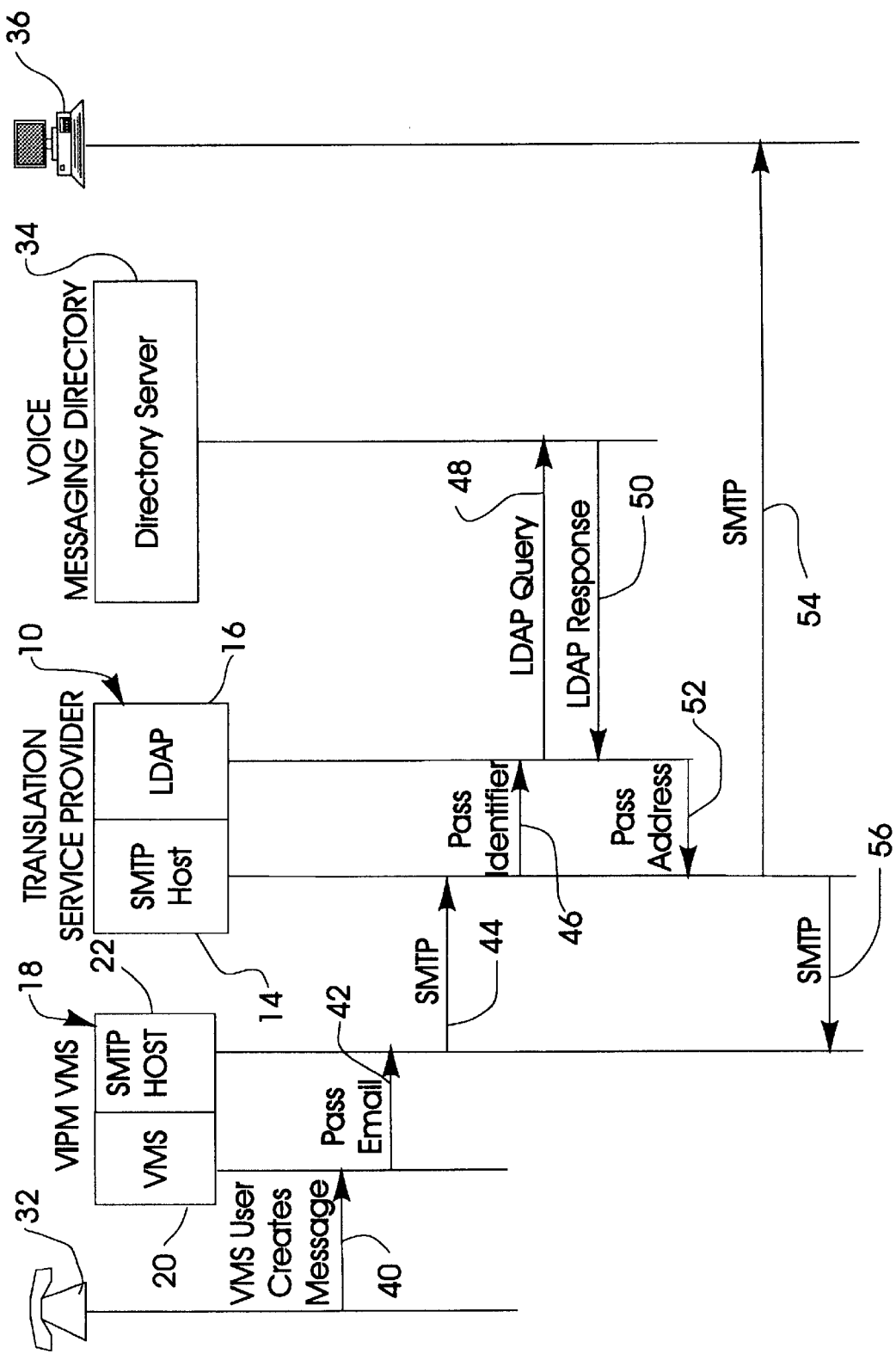
FIG. 2 is a sequence diagram showing a process for sending an information message over the Internet when the VPIM compliant VMS uses the translation services provided by the apparatus in accordance with the invention.

FIG. 2 is a sequence diagram showing the sequence of events which typically occur when an apparatus in accordance with the invention provides translation services to a client such as a VPIM compliant VMS which does not itself support directory standards. As described above, the VMS 18 includes a voice message system component 20 and an electronic mail host 22, preferably a SMTP host which is connected to the Internet. A telephone subscriber 32 uses the VMS 18 to create a voice message in a step 40 by way of a direct connection to a PBX (not shown) or dial-up connection through the PSTN 30 (see FIG. 1). The recipient of the voice message created in step 40 is typically identified to the VMS 18 using a telephone number. The telephone number may be the number of any recipient which can be direct-dialled provided that the recipient subscribes to facilities that support the delivery method. After the voice mail message is created in step 40, VMS 18 converts the message to an electronic mail format such as a SMTP format, addresses the message and passes it to the SMTP host 22 which in step 42, forwards the message over the Internet in step 44 to the SMTP host 14 of the translation service provider.

In accordance with a preferred embodiment of the invention, the electronic mail message passed from SMTP host 22 to SMTP host 14 is addressed in a format following the accepted standard of "local-part@domain-part" in which the "local-part" contains the unique identifier for the intended recipient and the domain-part identifies the SMTP host 14. When the SMTP host 14 receives the electronic mail message dispatched in step 44, it passes the message to an application process which stores the message in a memory and extracts the local-part of the address. The local-part of the address is passed to an LDAP process which formulates a query that is dispatched over the Internet in step 48 to a directory server 34, which supports a directory such as a global voice messaging directory. The directory server 34 uses the unique identifier for the recipient to retrieve desired information about the recipient, such as their electronic mail address, for example. In step 50 the directory server 34 returns an LDAP response to the LDAP component of the translation service provider 10. The LDAP component extracts the required address from the LDAP response, if the response returns the desired information and passes the address in step 52 back to the application process which replaces the electronic mail address of the message received at the SMTP host 14 in step 44 with the address received in step 52. In step 54, the SMTP host dispatches the re-addressed voice message to an electronic mailbox which typically resides on a mail server 36 of an Internet service provider, or the like. The recipient of the voice mail message then retrieves the message from the mail server 36 in a manner well known in the art. Optionally, if requested by the originator the translation service provider 10 may return a confirmation message in step 56 to the SMTP host 22 of the VMS 18 to inform the VMS 18 that the translation service was successful and the voice message was forwarded to the recipient.

Figure 3:
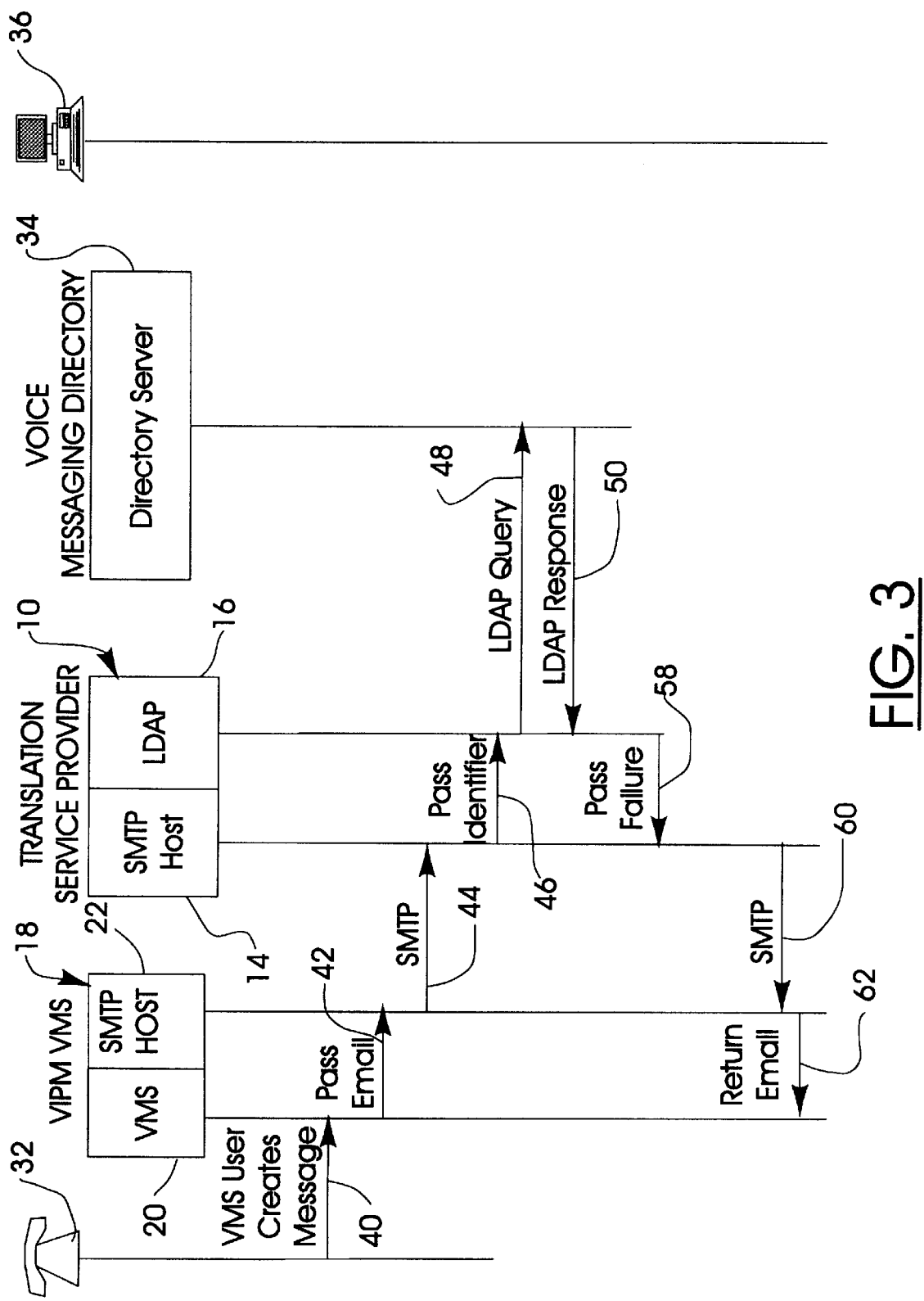
FIG. 3 is a sequence diagram showing the process illustrated in FIG. 2 when a directory service query fails to return the required address for the information message to be sent to a recipient over the Internet.

FIG. 3 is a sequence diagram showing a typical sequence of events which occurs when the apparatus in accordance with the invention is unable to retrieve an address requested of the translation service provider 10. As described above, the telephone subscriber 32 creates a voice mail message by dialling into the voice mail system 20 in step 40. The VMS 18 responds by converting the voice message into an electronic mail format and addressing the message to the SMTP host 14 of the translation service provider 10. The message is then passed to the SMTP host component 22 of the VMS 18 in step 42. The SMTP host 22 dispatches the electronic message over the Internet in step 44 and it is received by the SMTP host 14. An application process running at the translation service provider 10 accepts the electronic mail message from the SMTP host 14 and stores it in memory. The application process extracts the unique identifier for the recipient of the voice message and passes the identifier in step 46 to the LDAP directory process 16 which formulates an LDAP query using the unique identifier and dispatches it over the Internet in step 48 to a directory server 34. If the directory server 34 cannot locate the recipient using the unique identifier, for example, if the recipient is not in the directory and no knowledge reference points to another directory which may contain the required information, the directory server 34 returns an LDAP response in step 50 to the LDAP process 16 of the translation service provider 10. The LDAP response indicates that the desired information could not be located. On receipt of a failure message from the LDAP process in step 58, the application process running on the translation service provider 10 re-addresses the electronic mail message and returns it to the SMTP host 22. A notification is then returned via the Internet in step 60 to the SMTP host 22. The notification may include the original voice message. On receipt of the notification, the SMTP host 22 passes the notification to the VMS 18 which preferably then alerts the subscriber 32 of the failure by posting the notification in the voice mailbox of the subscriber 32.

The translation service provider may likewise provide translation services to other telecommunications application processes such as a telemarketing service provider 24 (see FIG. 1). FIG. 4 shows a sequence diagram of a typical sequence of events in which the translation service provider 10 provides translation services to a telemarketing service 24.

A telephone subscriber 32 connected to the PSTN 30 (see FIG. 1) is called by a telemarketing service 24 which initiates a dial-up connection in step 62. Conversation ensues with a telemarketing agent in step 64. As a result of the conversation, the telephone subscriber 32 requests that information respecting a product or service offered by the telemarketing service be dispatched to the subscriber 32 over the Internet by electronic mail in step 66. Rather than occupy the time of the telemarketing agent 26 and the telephone subscriber 32 in recording an electronic mail address, and risk the inaccuracies of transcription, the agent for the telemarketing service 18 does not request the electronic mail address of the telephone subscriber 32. Rather, the agent 26 of the telemarketing service 24 initiates an application process which formulates an electronic mail information message including the information requested by the telephone subscriber 32 and a unique identifier for the telephone subscriber 32, in this case the telephone number of the telephone subscriber 32. That electronic message is passed to the SMTP host 28 in step 68. The SMTP host 28 dispatches the electronic mail message in step 70 over the Internet to the SMTP host 14 of the translation services provider 10. On receipt of the message dispatched in step 70, an application process operating on the apparatus in accordance with the invention stores the message in memory and extracts the telephone number of telephone subscriber 32 from the local-part of the electronic mail address, as described above. The telephone number of the telephone subscriber 32 is then passed to an LDAP application process 16 in step 72, which formulates an LDAP query including the telephone number of the telephone subscriber 32 and dispatches the query over the Internet to the directory server 34 in step 74. The directory server 34 retrieves the requested electronic mail address from the appropriate directory entry and returns an LDAP response in step 76 which is passed to the application process that operates on the apparatus 10 in accordance with the invention. The application process is passed the address in step 78 and inserts the address into the information message received in step 70. The re-addressed information message is then passed to the SMTP host 14 which dispatches it over the Internet in step 80 to a mail server 36, which is typically the mail server of an Internet service provider. The SMTP host 14 may then optionally, if requested by SMTP host 28, return a confirmation message to the SMTP host 28 in step 82 to inform the telemarketing service 26 that the requested information was sent to the mailbox of the telephone subscriber 32.

Although the apparatus 10 in accordance with the invention has been explained with reference to only two telecommunications applications, it will be apparent to those skilled in the art that the apparatus for providing translation services in accordance with the invention has many additional applications and enables application processes such as VPIM compliant VMSs to be brought to market more quickly because they need not support directory standards.

Changes and modifications to the preferred embodiment described above may become apparent to those skilled in the art. The scope of the invention is therefore intended to be limited solely by the scope of the appended claims.

I claim:

1. Apparatus for providing translation services to permit a telecommunications application process to send an information message over a data transmission facility when an electronic mail address of an addressee of the message is unknown, but at least one unique identifier for the addressee is known, comprising:

a host connected to the data transmission facility for receiving a data message from the telecommunications application process which is a client connected to the data transmission facility, the data message including the information message and the at least one unique identifier for the addressee of the information message, the host having means for deriving an electronic mail address for the addressee of the information message given the at least one unique identifier for the addressee, means for re-addressing the information message with the electronic mail address of the addressee, and means for forwarding the information message to the addressee by electronic mail;

wherein the data transmission facility is the Internet and the client sends the data message to the host as an electronic mail message over the Internet.

2. Apparatus for providing translation services to permit a telecommunications application process to send an information message over a data transmission facility as claimed in claim 1 wherein the electronic mail message sent by the caller to the host is addressed to "local-part@domain-part", the "local part" comprising the at least one unique identifier for the addressee and the "domain-part" comprising the domain name of the host.

3. Apparatus for providing translation services to permit a telecommunications application process to send an information message over a data transmission facility as claimed in claim 1 wherein the at least one unique identifier for the addressee comprises the telephone number of the addressee.

4. Apparatus for providing translation services to permit a telecommunications application process to send an information message over a data transmission facility as claimed in claim 1 wherein the means for deriving the electronic mail address for the addressee comprises facilities for querying a directory server using at least one unique identifier to locate an entry for the addressee of the information message.

5. Apparatus for providing translation services to permit a telecommunications application process to send an information message over a data transmission facility as claimed in claim 4 wherein the directory is a global voice messaging directory.

6. Apparatus for providing translation services to permit a voice message to be sent over a data transmission facility as claimed in claim 5 wherein the facilities for querying the directory server comprise Light-Weight Directory Access Protocol (LDAP).

7. Apparatus for providing translation services to permit a voice message to be sent via Internet when an electronic mail address of an addressee of the voice message is unknown, but at least one unique identifier for the addressee is known, comprising:

a host connected to the Internet for receiving an electronic mail message from a client requiring the translation services, the electronic mail message including the voice message and the at least one unique identifier for the addressee of the voice message, the host having means for querying a directory service to obtain the electronic mail address for the addressee of the voice mail message using the at least one unique identifier for the addressee, means for re-addressing the voice message with the electronic mail address of the addressee, and means for forwarding the voice message to the addressee as an electronic mail message.

8. Apparatus for providing translation services to permit a voice message to be sent via the Internet as claimed in claim 7 wherein the host uses an LDAP protocol to query the directory service for the electronic mail address.

9. Apparatus for providing translation services to permit a voice message to be sent via the Internet as claimed in claim 7 wherein the host returns an acknowledgement message to the client when the voice message is successfully sent, and the host returns the voice message as part of a notification message if the host is unable to retrieve an electronic mail address for the addressee.

10. Apparatus for providing translation services to permit a voice message to be sent via the Internet as claimed in claim 9 wherein the client returns a delivery failure message to a sender of the voice message if it the voice message is returned to the client.

11. A method of providing translation services to permit a telecommunications application process to send an information message over the Internet to an unknown address of a recipient of the information message when a unique identifier for the recipient is known, comprising the steps of:

(a) receiving from the telecommunications application process an electronic mail message sent over the Internet to an electronic mail host; the electronic mail message including the information message and the unique identifier for the recipient;

(b) passing the electronic mail message to an application process which extracts the unique identifier from the electronic mail message and dispatches a query over the Internet to a directory server to obtain the unknown address of the recipient from the directory server;

(c) receiving a response to the query sent to the directory server;

(d) extracting the unknown address from the response if the response returned an address;

(e) inserting the address in the information message if an address was returned by the response; and (f) forwarding the information message over the Internet using the address if an address was returned by the response.

* * * * *